United States Patent
Andersson

[15] 3,655,073
[45] Apr. 11, 1972

[54] ARRANGEMENT FOR COLLECTING MATERIAL AND REMOVING IT PERPENDICULARLY TO ITS LONGITUDINAL DIRECTION

[72] Inventor: Curt Erik Ingvar Andersson, Stora Tuna, Sweden

[73] Assignee: Kockum Soderhamn AB, Soderhamn, Sweden

[22] Filed: Mar. 24, 1970

[21] Appl. No.: 22,168

[52] U.S. Cl.................................214/16 B, 209/74, 214/6 D
[51] Int. Cl..........................................B65g 65/02
[58] Field of Search....................214/6 H, 6 D, 42, 43, 16 B; 209/74

[56] References Cited

UNITED STATES PATENTS

| | | | |
|---|---|---|---|
| 1,472,054 | 10/1923 | Drake.................................. | 214/16 B |
| 3,498,503 | 3/1970 | Holmberg et al................... | 214/16 B X |

Primary Examiner—Richard A. Schacher
Assistant Examiner—Gene A. Church
Attorney—Sommers and Young

[57] ABSTRACT

Apparatus for collecting and transporting articles which includes article receiving means that has bottom support arms which are movable between an article supporting position and an article discharging position. A releasable locking means permits the selective locking of the support arms in their article supporting position. A transport carriage is provided which is movable in a generally horizontal direction from a position directly below the article receiving means to an article unloading position. The carriage has a vertically adjustable platform with a means which is effective when the platform is raised to a predetermined height relative to the article receiving means to release the locking means and thereby permit movement of the support arms to their article discharging position. In addition, a means on the carriage restores the support arms to their article supporting position upon movement of the carriage from its position directly below the article receiving means to its unloading position.

5 Claims, 5 Drawing Figures

ARRANGEMENT FOR COLLECTING MATERIAL AND REMOVING IT PERPENDICULARLY TO ITS LONGITUDINAL DIRECTION

This invention relates an arrangement for collecting material and automatically transporting it away perpendicularly to its longitudinal direction from sorting means, for example drop sorting means, where the material is distributed to different boxes according to quality or dimension.

A plurality of different embodiments are previously known. These known arrangements, however, usually comprise chains or carriages which when a sufficient number of, for example, the planks have been sorted, for example by drop sorting, transport them away in their longitudinal direction to collecting boxes. These collecting boxes require a permanent control by a labour, and also the transport entirely or partially is carried out manually. This transport in the longitudinal direction of the material implies large space requirements and the continuous employment of trucks or the like.

The invention has as its object to produce a cheap and reliable construction, which saves labour and space.

An expedient embodiment of the invention is described in the following, with reference to the enclosed drawings.

Figure 1:
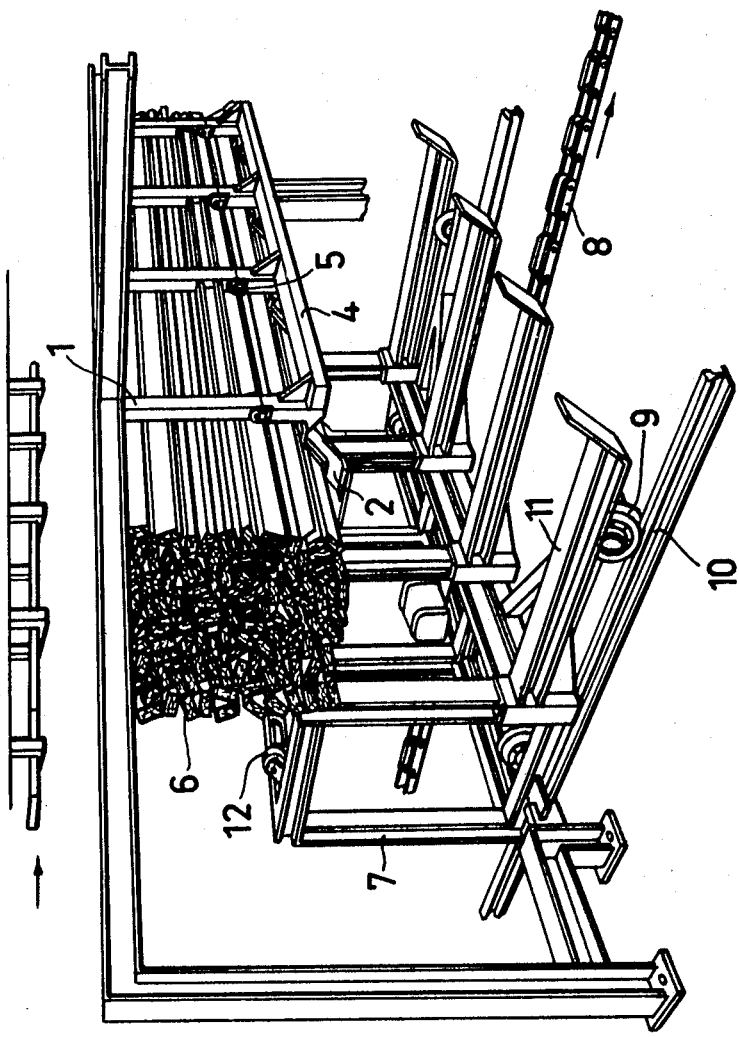
FIG. 1 shows a perspective view of the collecting box and transport means.
Figure 2:
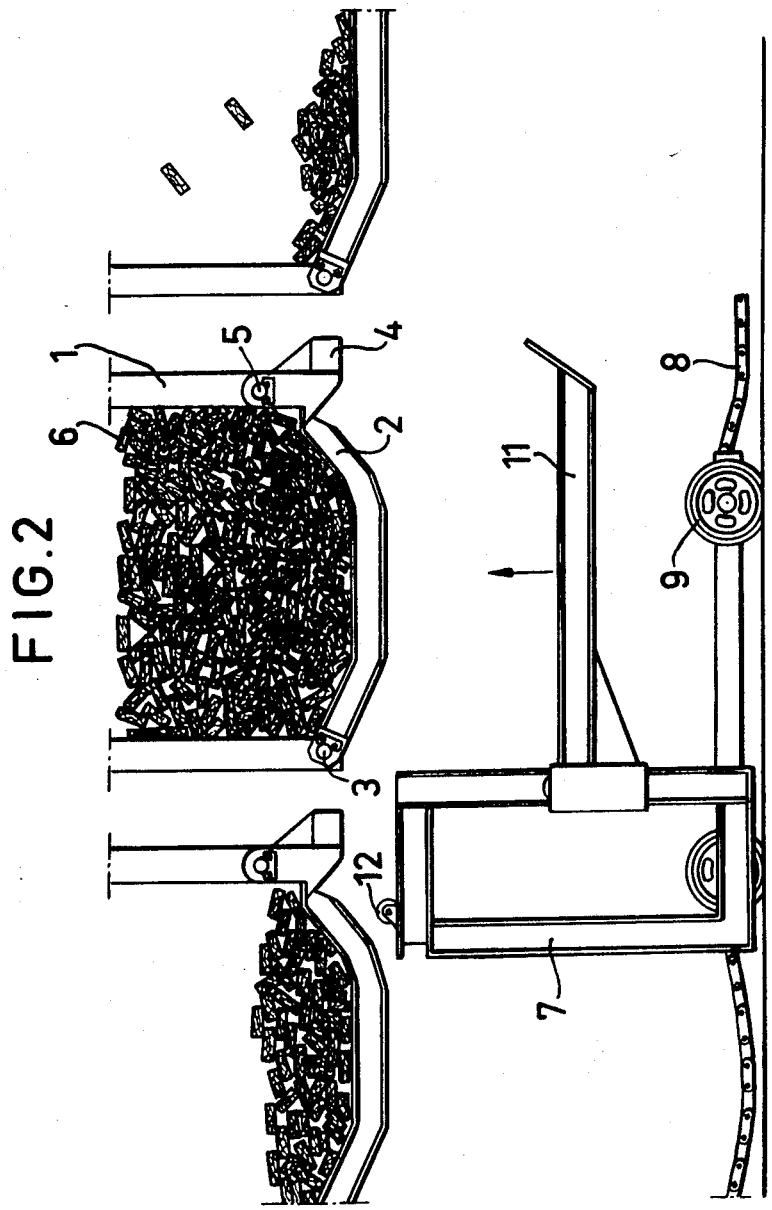
FIG. 2 shows the transport means when it has arrived at a collecting box to be emptied. The hoist brackets of the transport means are on their way upwards for fetching the material in the box.
Figure 3:
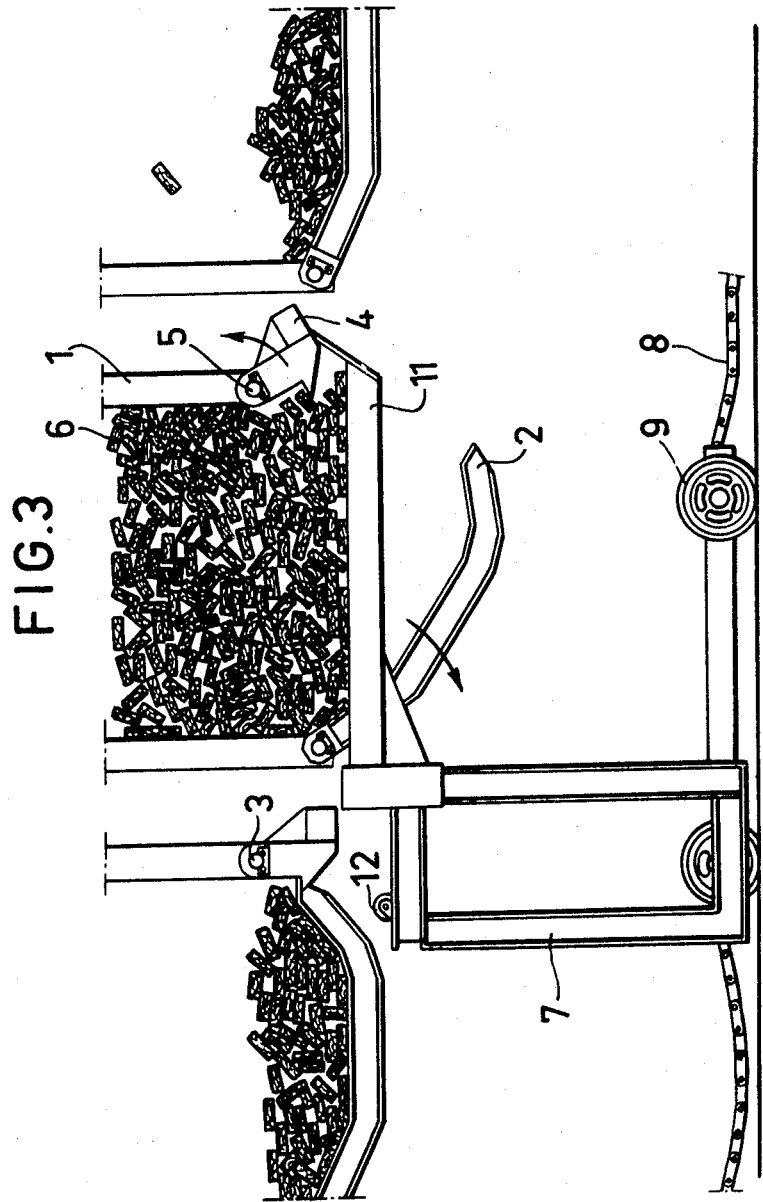
FIG. 3 shows how the hoist brackets of the transport means release of locking means of the collecting box whereby the support arms of the collecting box are hinged down, and the material in the box is supported on the hoist brackets.
Figure 4:
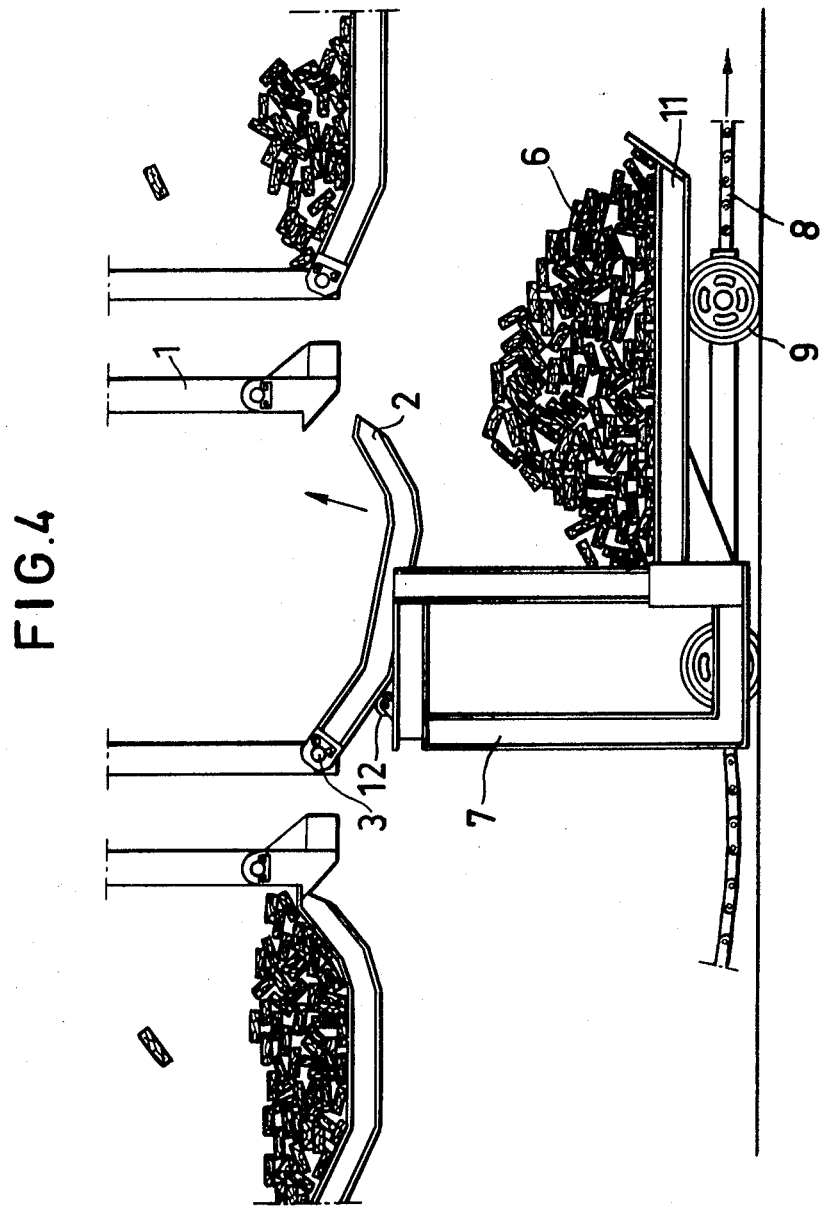
FIG. 4 shows the hoist brackets after they have moved down and the transport means has been caused to travel to an unloading place. The support arms of the collecting box are put into collecting position by a restoring wheel on the transport means and locked in the locking means.
Figure 5:
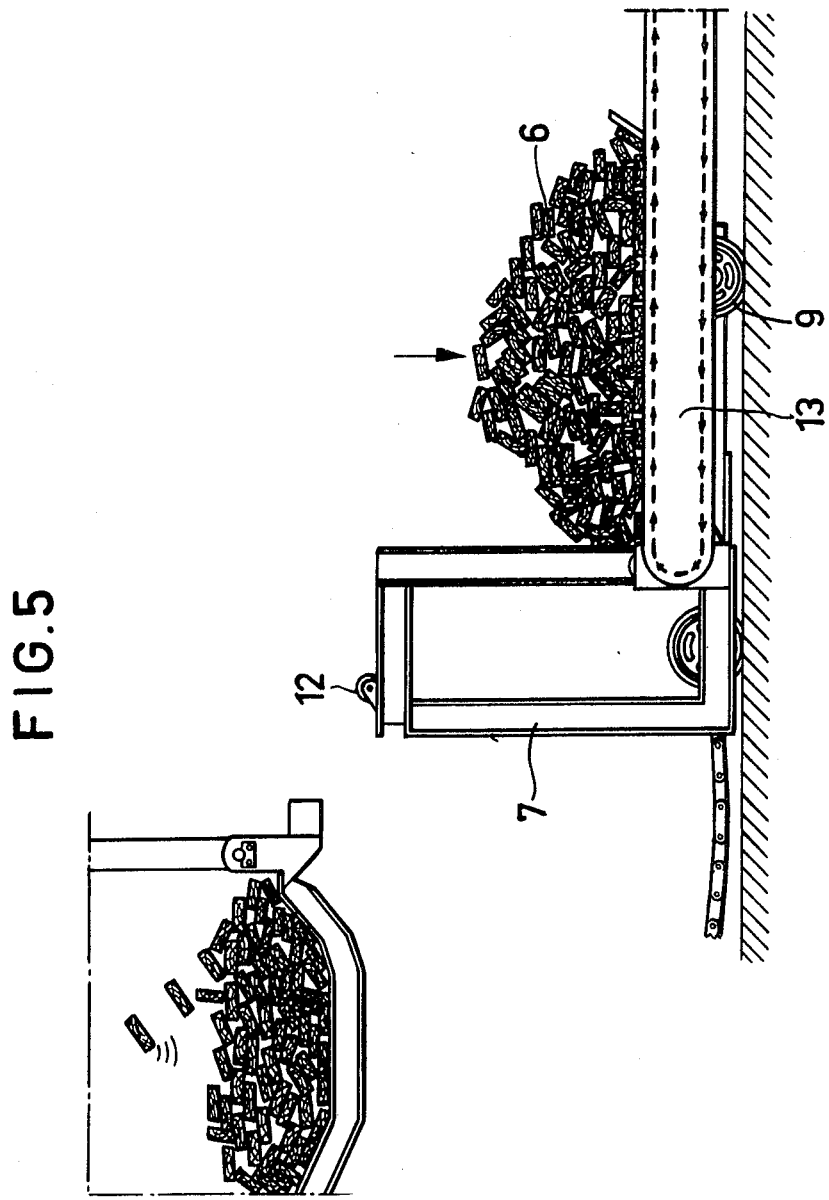
FIG. 5 shows how the hoist brackets of the transport means place the material at the unloading place onto a lateral conveyor, for example.

Referring to the drawings, 1 designates the collecting box proper, and 2 designates support arms of the collecting box which via the axle 3 are hinged to the collecting box 1. Said support arms 2 are locked in collecting position by the locking means 4 which is mounted to the collecting box 1 via the axle 5 so as to be pivotal. Said locking means 4 is so designed that subsequent to its actuation it always returns to locking position. On said support arms 2 the material to be sorted, for example timber 6, is collected. The transport means 7 is build on wheels 9, tracks 10 and is driven by a chain 8 or the like. On said transport means 7 are provided guided hoist brackets 11, which at one end are designed so that the hoist brackets when they are in their top position release the locking means 4. On said transport means 7 is mounted a restoring wheel 12, which during the travel of the transport means to the unloading place, for example a lateral conveyor 13 (see FIG. 5), returns the support arms 2 to collecting position where they are locked by the locking means 4. The transport means after having delivered the material 6 at the unloading place 13 is ready for fetching material from another collecting box.

What I claim is:

1. Apparatus for collecting and transporting articles comprising in combination,
    at least one article receiving means having bottom support arms which are movable between a first article supporting position and a second article discharging position,
    said article receiving means including releasable locking means for selectively locking said support arms in said first position,
    a transport carriage movable in a generally horizontal direction from a first position below said article receiving means to a second unloading position,
    said carriage having a vertically adjustable loading platform having means effective when said platform is raised to a predetermined height relative to said article receiving means to release said locking means and thereby permit movement of said support arms to said second position,
    and further means on said carriage for restoring said support arms to their said first position upon movement of said carriage from its said first position to its said second position to thereby permit the locking of said support arms in their first position by said locking means.

2. The apparatus of claim 1 which further includes means for moving said transport carriage between its said first and second positions.

3. The apparatus of claim 1 in which said further means on said transport carriage comprises wheels which during the travel of said transport carriage to said second unloading position engage said support arms to return them to their first position.

4. The apparatus of claim 1 in which said locking means is mounted to said article receiving means on a pivoted axle, said locking means subsequent to its actuation by said further means always returning to its said locking position.

5. The apparatus of claim 1 in which said loading platform comprises a plurality of arms which are vertically adjustable.

* * * * *

UNITED STATES PATENT OFFICE
CERTIFICATE OF CORRECTION

Patent No. 3,655,073  Dated April 11, 1972

Inventor(s) Curt Erik Ingvar Andersson

It is certified that error appears in the above-identified patent and that said Letters Patent are hereby corrected as shown below:

Foreign Application Priority Date

March 24, 1969 Sweden . . . . . . . . . . . . . . . 4061/69

Signed and sealed this 22nd day of August 1972.

(SEAL)
Attest:

EDWARD M. FLETCHER, JR.
Attesting Officer

ROBERT GOTTSCHALK
Commissioner of Patents